United States Patent [19]

Hamlen et al.

[11] Patent Number: 4,626,482
[45] Date of Patent: Dec. 2, 1986

[54] METAL/AIR BATTERIES

[75] Inventors: Robert P. Hamlen, Bernardsville; Peter F. Connolly, Parsippany, both of N.J.

[73] Assignee: Alupower, Inc., Bernardsville, N.J.

[21] Appl. No.: 798,988

[22] Filed: Nov. 18, 1985

[51] Int. Cl.[4] .......................................... H01M 12/06
[52] U.S. Cl. ........................................ 429/27; 429/99; 429/110
[58] Field of Search ................... 429/27, 110, 119, 96, 429/97, 99, 100

[56] References Cited

U.S. PATENT DOCUMENTS 3,193,413  7/1965  Tamminen ..................... 429/110 X
3,682,706  8/1972  Yardney et al. ..................... 429/27
4,389,466  6/1983  Joy ..................................... 429/27

*Primary Examiner*—Anthony Skapars
*Attorney, Agent, or Firm*—Cooper, Dunham, Griffin & Moran

[57] ABSTRACT

A metal/air battery having plural series-connected cells, including a tank for holding a body of liquid electrolyte, and an electrically nonconductive frame carrying a plurality of air cathodes facing a common air chamber and a like plurality of anodes respectively juxtaposed to the cathodes outside the air chamber, the frame being removably insertable in the tank and engaging the tank wall, when inserted, so as to divide the tank into a plurality of separate and substantially electrically isolated electrolyte-holding zones each containing one anode-cathode pair. The anodes may have vertical slots to facilitate passage of electrochemical reaction products from the anode-cathode gaps. The battery may be incorporated in a lamp having a light bulb in a cartridge slidably held between resilient arms with electrical contacts arranged as a switch to close an otherwise-open circuit including the battery and the light bulb when the cartridge is moved to the extremity of the arms.

14 Claims, 7 Drawing Figures

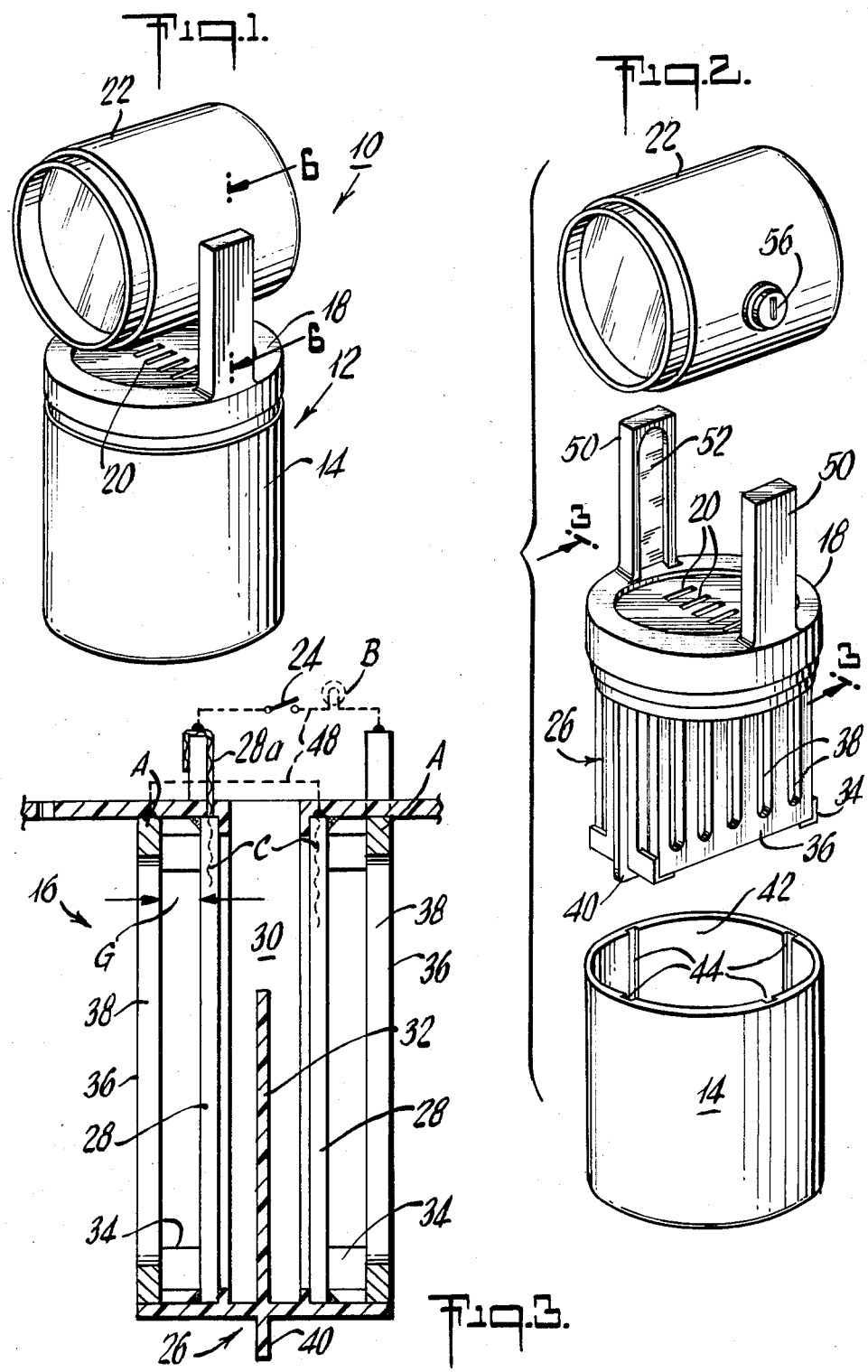

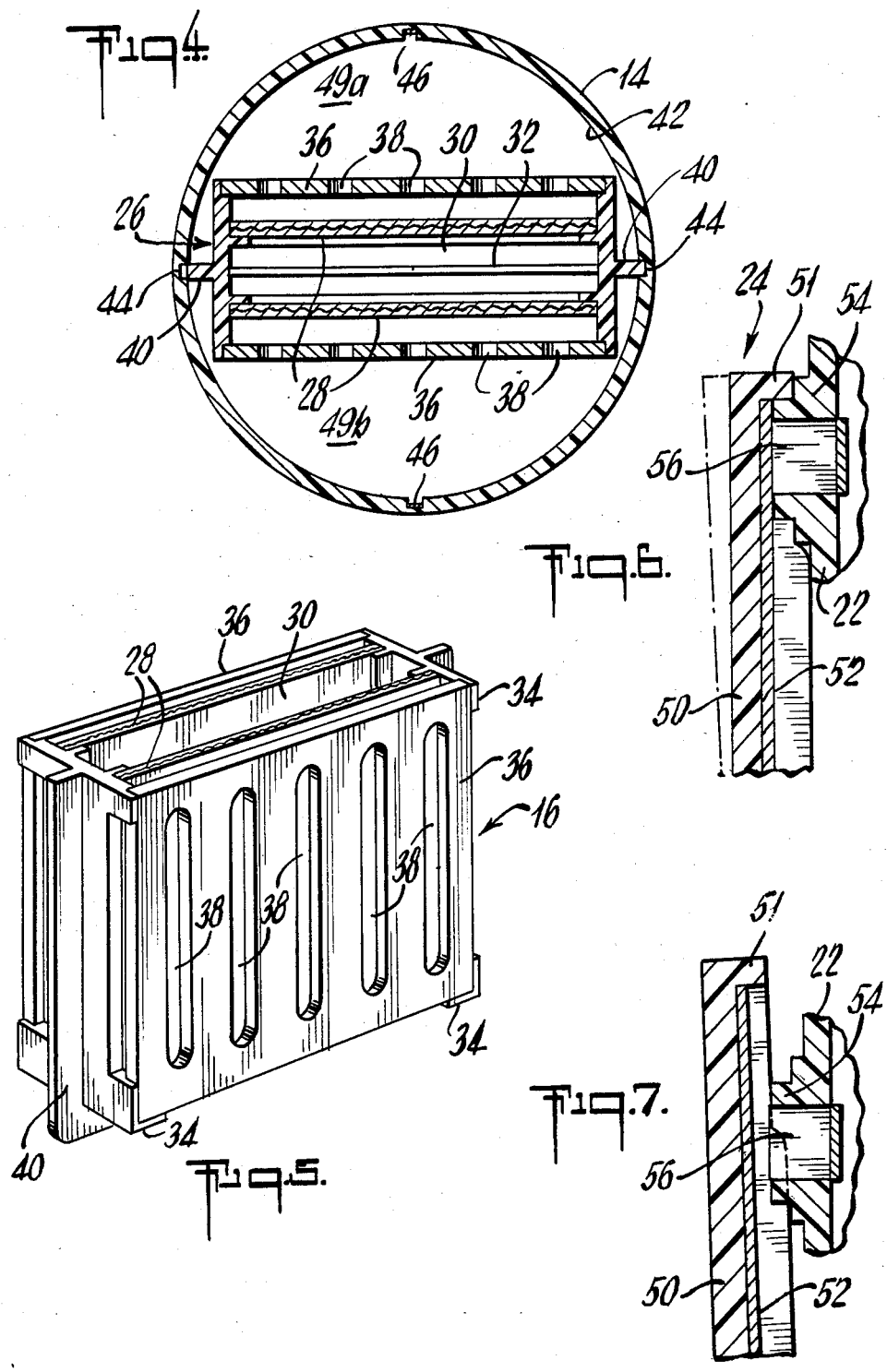

METAL/AIR BATTERIES

BACKGROUND OF THE INVENTION

The invention relates to metal/air battery constructions and to applications thereof.

Metal/air batteries produce electricity by the electrochemical coupling of a reactive metallic anode to an air cathode through a suitable electrolyte in a cell. As is well known in the art, an air cathode is a typically sheet-like member, having opposite surfaces respectively exposed to the atmosphere and to the aqueous electrolyte of the cell, in which (during cell operation) atmospheric oxygen dissociates while metal of the anode oxidizes, providing a usable electric current flow through external circuitry connected between the anode and cathode. The air cathode must be permeable to air but substantially hydrophobic (so that aqueous electrolyte will not seep or leak through it), and must incorporate an electrically conductive element to which the external circuitry can be connected; for instance, in present-day commercial practice, the air cathode is commonly constituted of active carbon (with or without an added dissociation-promoting catalyst) containing a finely divided hydrophobic polymeric material and incorporating a metal screen as the conductive element. A variety of anode metals have been used or proposed; among them, alloys of aluminium and alloys of magnesium are considered especially advantageous for particular applications, owing to their low cost, light weight, and ability to function as anodes in metal/air batteries using neutral electrolytes such as sea water or other aqueous saline solutions.

Thus, by way of more specific example, an illustrative aluminum/air cell comprises a body of aqueous saline electrolyte, a sheetlike air cathode having one surface exposed to the electrolyte and the other surface exposed to air, and an aluminum alloy anode member (e.g. a flat plate) immersed in the electrolyte in facing spaced relation to the firstmentioned cathode surface. The discharge reaction for this cell may be written

$$4Al + 3O_2 + 6H_2O \rightarrow 4Al(OH)_3.$$

As the reaction proceeds, copious production of the aluminum hydroxide reaction product (initially having a gel-like consistency) in the space between anode and cathode ultimately interferes with cell operation, necessitating periodic cleaning and electrolyte replacement. Recharging of the cell is effected mechanically, by replacing the aluminum anode when substantial anode metal has been consumed in the cell reaction.

Metal/air batteries have an essentially infinite shelf-storage life so long as they are not activated with electrolyte, making them very suitable for standby or emergency uses. For example, an emergency lamp or lantern can be constructed with a metal/air battery such as an aluminum/air battery, and a separate container of electrolyte can be stored with the battery, or be readily available within its intended environment of use. When a need for use of an emergency light arises, a user can merely activate the metal-air battery (by immersing the electrode in the electrolyte) and be provided with useful light.

As any consumer can appreciate, a lantern with an infinite storage life is much more reliable than common dry-cell battery-powered lanterns, having batteries which tend to deteriorate with shelf storage. Reaching for a dry-cell-powered lantern in an emergency, only to find that the batteries have deteriorated to a discharged condition, is a frustration experienced by many people. A metal/air-battery-powered lantern avoids such a problem, because the cells cannot be depleted until the battery is filled with electrolyte.

The voltage of a single metal/air cell such as a magnesium or aluminum air cell is or may be less than that required for a lantern or other use. In such case, as well as for other purposes, a plurality (typically two) of the cells may be connected in series. Desirable characteristics of a plural-cell metal/air battery include structural simplicity and compactness, ease of activation (bringing the electrodes into contact with electrolyte) by an unskilled user, and avoidance of current paths through the electrolyte between electrodes of like polarity in different cells.

The provision of a metal/air battery-powered lantern for emergency situations is proposed in Watakabe, "Magnesium-Air Sea Water Primary Batteries," *Solar Cells*, Vol. II (Cleveland: JEC Press Inc., 1979). This publication shows a "life-torch" with a series-connected twin cell battery of "inside-out" construction, namely a pair of spaced-apart magnesium anodes having a pair of cathodes interposed between them and mutually defining a common air space. Each anode-cathode pair is surrounded by a separate electrolyte space (within a housing) to prevent or minimize electrolytic shunting between the battery cells. As those skilled in the art can appreciate, since the anodes of a pair of series-connected metal/air battery cells are at different potentials, the existence of a current path through the electrolyte between the anodes of the respective cells will cause undesired shunting of current and can significantly impair cell efficiency.

The above-cited publication contemplates use of the described device at sea, attached to a life jacket so that the battery floats substantially immersed in sea water, which enters inlets formed in the housing, one for each cell, separately filling each of the two electrolyte spaces. These inlets are widely spaced apart to reduce electrolytic shunting through the ambient sea. Such a battery uses the sea as the saline electrolyte for the battery and isolates this electrolyte into two separate tanks, one for each battery cell. Thus, to activate the described battery, one need only insert the lantern into the sea.

On land, utilization of a battery constructed in accordance with the above-cited publication would require pouring saline electrolyte into each of the battery inlets. As one can appreciate, the pouring of electrolyte into separate inlet ports can be extremely difficult, especially in the dark. An easier method of filling electrolyte into the batteries is desirable for land applications. Moreover, the device of the above-cited publication is evidently designed for a single use in a marine emergency; for a routine consumer land application, such as during power failure emergencies or extremely inclement weather, it would be desirable to have a battery that could be repeatedly activated by pouring electrolyte into the cells, and repeatedly deactivated by removing the electrolyte from the cells and cleaning out reaction products formed within the cells, without the hindrance of separate tanks for the two cells.

Also, it would be desirable to retard the accumulation of reaction product in the anode-cathode gap of a metal/air cell or battery, such as an aluminum/air battery, thereby to prolong the period of active use of the cell or battery between cleanings. In this regard, it has heretofore been proposed to provide a relatively wide anode-cathode gap for preventing flow of fresh electrolyte around the gap edges, generally parallel to the electrode surfaces; but cell efficiency decreases with increasing anode-cathode distances. Another proposal, set forth in the *Handbook of Batteries and Fuel Cells* (McGraw-Hill, 1984), p. 30-11, is to prevent hydroxide gel formation by employing a caustic electrolyte rather than a neutral saline electrolyte, but caustic electrolytes are disadvantageous (as compared to saline electrolyte) from the standpoint of convenience, cost, and safety in handling.

SUMMARY OF THE INVENTION

The present invention broadly contemplates the provision of a metal air battery comprising a tank defining a single continuous reservoir for liquid electrolyte; a plurality of air cathodes each having first and second opposed surfaces; an electrically nonconductive frame carrying the cathodes in electrically isolated relation to each other and defining with the cathode first surfaces a liquid-tight air chamber open to ambient atmosphere, the frame being removably insertable in the reservoir to expose the cathode second surfaces to electrolyte therein; a plurality of metal anodes, one for each cathode, disposed for immersion in electrolyte in the reservoir in spaced juxtaposed relation to the cathode second surfaces to constitute therewith a plurality of anode-cathode pairs each electrically coupled by electrolyte; circuit means for connecting the anode-cathode pairs in series to each other and to an external load; and electrically nonconductive means for engaging the frame with the tank, when the frame is inserted in the reservoir, to divide the reservoir into a plurality of separate and substantially electrically isolated electrolyte-holding zones each containing one anode and the cathode second surface juxtaposed thereto, so as to inhibit anode-to-anode current flow through the electrolyte.

With this arrangement of elements, activation of the battery is readiy accomplished by filling the single reservoir to a suitable level with a saline solution or other aqueous electrolyte while the frame is removed from the tank, and then inserting the frame in the tank so that the anodes and the second surfaces of the cathodes are in contact with the electrolyte, which substantially fills the spaces or gaps between the cathode second surfaces and the anodes respectively juxtaposed therewith. Cleaning of the battery, for removal of accumulated electrolytic reaction product therefrom, is similarly facilitated by the fact that when the frame is withdrawn from the tank there remains a single continuous reservoir of electrolyte.

In the assembled battery, the engaging means effectively divides the electrolyte into separate, electrically isolated zones or subreservoirs, one for each anode-cathode pair or cell, inhibiting flow of electric current through the electrolyte between anodes. This substantial prevention of anode-to-anode shunting currents at least largely eliminates the impairment of cell efficiency that would result if such shunting occurred to a significant degree. It is not necessary that the engaging means provide a liquid-tight seal between adjacent zones; the frame-tank engagement at least greatly constricts the cross-sectional area of any electrolyte path for current flow between anodes, increasing the resistance of such paths sufficiently to minimize shunting therethrough. Thus the invention provides the advantages of a single electrolyte chamber or reservoir and a series battery of two (or more) cells without the drawback of reduced efficiency of anode-to-anode shunting.

Advantageously, and preferably, the anodes are carried by the frame (externally of the air chamber) for insertion therewith in the reservoir, so that the anodes, cathodes and frame together constitute a single, easily manipulated structural unit.

In some embodiments, the engaging means may include a nonconductive fin projecting from one of the frame and tank for engaging the other (tank or frame) when the frame is inserted in the reservoir. When one of these two elements (frame or tank) is provided with such a fin, e.g. formed integrally therewith, the other (tank or frame) may be formed with a groove for receiving the fin. The engaging means may additionally or alternatively include a nonconductive gasket, carried by one of the frame and tank for engaging the other upon insertion of the frame in the reservoir. In currently preferred constructions, the engaging means comprises portions of the frame electrically insulating the cathodes from each other and simultaneously engageable with the tank, when the frame is inserted in the reservoir, to divide the reservoir into the aforementioned plurality of separate and substantially electrically isolated electrolyte-holding zones. These frame portions may simply be dimensioned to abut the side and bottom walls of the tank, with curved (or flat) surface-to-surface contact, or may carry projecting structures such as a fin or a gasket for engagement with, or insertion in a slot formed in, the wall of the tank. It will be understood that in any event, the engaging means (carried by the frame and/or by the tank) provides essentially continuous frame-tank engagement at the boundary between adjacent electrolyte-holding zones, over the full extent of that boundary (i.e. at least up to the level to which the zones are filled with electrolyte).

As a further feature of the invention, in embodiments wherein the cathode surfaces extend generally vertically, and the frame includes a portion closing the bottom of the air chamber, electrically nonconductive, liquid-impermeable barrier means may be disposed within the air chamber, projecting upwardly from the bottom-closing frame poriton, for preventing cathode-to-cathode electric current flow through any liquid that may enter and collect in the bottom of the air chamber.

Still further in accordance with the invention, each of the anodes may be a metal plate having opposed substantially vertical major surfaces both disposed for exposure to electrolyte in one of the aforementioned zones, one major surface of each anode being positioned in spaced juxtaposed relation to a cathode second surface to define therewith an anode-cathode gap for receiving electrolyte, and each anode plate may be formed with a plurality of vertically elongated slots extending downwardly from a locality adjacent but below the top of the anode-cathode gap through both major surfaces of the plate for egress of electrolytic reaction product, formed in the anode-cathode gap when the gap is filled with electrolyte, from the gap to a region of the zone external to the gap.

Provision of these slots, enhancing communication of the anode-cathode gap of each cell with a substantial volume of electrolyte beyond the gap (affording an enlarged collection region for reaction product) increases the useful cell cycle lifetime, i.e. between cleanups, yet with a small (and consequently advantageously efficient) anode-cathode spacing. The specific (vertically elongated) configuration of the slots promotes passage of the reaction product from the anode-cathode gap to the enlarged collection region.

One particularly useful application of the battery of the invention is in the provision of an electric lamp, having a conventional battery-energizable light bulb as the load of the external circuit, e.g. mounted on a housing constituted by the assembled tank and frame. Additional features of the invention reside in a specific switch assembly for a light mounted on the frame.

Further features and advantages of the invention will be apparent from the detailed description hereinbelow set forth, together with the accompanying drawings.

BRIEF DESCRIPTION OF THE DRAWINGS

FIG. 1 is a perspective view of a battery embodying the invention in a particular form, as incorporated in an emergency lamp;

FIG. 2 is an exploded view thereof;

FIG. 3 is a fragmentary side elevational view, partially in section, of the anode-cathode-frame structure included in the battery of FIGS. 1 and 2;

FIG. 4 is a plan sectional view of the battery of FIGS. 1 and 2, taken along line 4—4 of FIG. 2, and including the electrolyte tank;

FIG. 5 is a perspective view of a portion of the structure of FIG. 3, particularly showing a preferred form of anode;

FIG. 6 is a detailed fragmentary sectional view of the electrical contact switch included in the lamp of FIGS. 1 and 2 taken along line 6—6 of FIG. 1, with the switch closing the electrical circuit between the lamp bulb and the battery cells; and FIG. 7 is a similar view of the same switch in open condition.

DESCRIPTION OF THE PREFERRED EMBODIMENTS

The drawings illustrate one representative embodiment and use of a battery cell constructed in accordance with the teachings of the present invention in a two-cell emergency lamp 10. Referring to FIGS. 1 and 2, lamp 10 has a metal/air battery 12, such as an aluminum/air battery, which includes a tank 14 containing a bath of electrolyte solution such as an aqueous saline (NaCl) solution, and an anode-cathode package 16 conveniently attached to a base 18, which is removably mountable upon the top of tank 14. Base 18 has a vent 20 for communication of air to the anode/cathode package as will be discussed below. A lamp member 22 is also supported on the base 18 and battery 12 by structure providing an electrical switch 24 (FIGS. 6 and 7). The electrical switch 24 allows selective on-off connection between the battery and the lamp.

The tank 14 is a unitary, electrically nonconductive body (e.g. a molded plastic element) having an inner wall defining a downwardly closed, upwardly open cylindrical volume which constitutes a single continuous reservoir for holding a body of the liquid electrolyte. The base 18 seats upon the upper rim of the tank to close the open top of this reservoir. The anode-cathode package 16 is secured to and depends from the base 18, so that when the base 18 is seated on the tank rim (in the position shown in FIG. 1), the anode-cathode package projects downwardly into the reservoir for contact of the anodes and cathodes of the package with electrolyte contained in the tank.

Referring now to FIG. 3, the anode-cathode package 16 includes an electrically nonconductive frame 26. In the two-cell construction shown in the preferred embodiment, frame 26 has a pair of air cathodes C,C attached thereto in opposed, mutually spaced relationship. Any suitable air cathode known to those skilled in the art may be utilized. The frame in combination with the cathodes C,C forms a liquid-tight air chamber 30, to prevent entry of electrolyte fluid into the chamber. Air chamber 30 communicates with the ambient atmosphere through vent 20. It is desirable to avoid the entry of electrolyte fluid into the air chamber, because electrolyte if present therein could cause a short circuit between the cathodes. As an added safety feature, an electrically nonconductive baffle 32 may be disposed in the air chamber, if desired, to prevent any fluid that should happen to enter the air chamber from providing a current path between the cathodes. The baffle 32 may be constructed to any desired height; however, a preferred height of the baffle is between about one fourth and one half the height of the cathodes.

A plurality of flanges 34 project from the frame 26 for attachement of metal anodes A,A thereto. Although separate means for mounting the anodes in the battery may be used, the inclusion of the anodes in the package 16, supported by the flanges 34, allows the anodes and cathodes to be permanently positioned relative to each other in a convenient, unitized anode-cathode package, which may be readily replaced by a consumer when spent.

More particularly, in the illustrated battery, each of the two cathodes C is a generally conventional air cathode 28 in the form of a rectangular sheetlike member having two opposed planar major surfaces, being constituted (for example) of two flat layers of an active carbon-hydrophobic polymer composition with a wire screen conductor 28a (FIG. 3) pressed between them. The frame 26 is a unitary, integral molded plastic element including a horizontal top portion mounted in the base 18; two vertical side portions depending from the top portion in facing spaced relation to each other; a bottom portion extending horizontally between the lower ends of the side portions; and the aforementioned flanges 34. Each of the air cathodes is mounted in the frame with its top edge secured to the frame top portion, its two vertical side edges respectively secured to the two frame side portions, and its lower edge secured to the frame bottom portions, in such manner that a continuous liquid-tight joint is provided between the cathode and frame around the entire periphery of the cathode.

The two cathodes, thus mounted, are disposed with their major surfaces oriented vertically in parallel relation to each other, such that one major surface of each cathode faces one major surface of the other cathode and is spaced therefrom by the frame side and bottom portions. These two last-mentioned cathode surfaces, in cooperation with the frame side and bottom portions, cooperatively define the liquid-tight air chamber 30, and are exposed to air therein. The opposite major surfaces of the two cathodes, facing away from the air chamber, are exposed to contact with electrolyte in the tank 14 when the package 16 is immersed therein. Owing to the substantially hydrophobic character of the cathodes, the aqueous electrolyte cannot penetrate the cathodes to enter the air chamber during such immersion.

Each of the metal anodes A is a flat aluminum alloy plate 36 having opposed parallel major surfaces. Two such anodes (one for each cathode) are provided in the described battery. Each anode is disposed in the package 16, and held by the nonconductive flanges 34, with its major surfaces oriented vertically, such that one of the major anode surfaces is spaced from, facing, and parallel to the electrolyte-exposed major surface of one of the cathodes. The package 16 thus includes two anode-cathode pairs or cells, each comprising one anode and one cathode with parallel facing major surfaces defining an anode-cathode gap G between them.

As will be appreciated, cell efficency is inversely related to the width of the gap G; hence, it is desirable to minimize the gap G; yet the gap should not be so small as to become prematurely clogged by accumulation of electrochemical reaction products therein. In an aluminum/air-saline electrolyte battery, the reaction product is aluminum hydroxide, which forms copiously in an initially gel-like state. To retard accumulation of reaction product within cell gap G, the anodes 36 may be constructed with one or more anode apertures 38 therethrough, allowing passage of electrolyte and reaction products through the anode. Electrolyte may also flow around the periphery of the anodes, thus insuring reaction product transport through many different flow paths. In this manner, reaction products can be transported away from the cathode region in the cell gap G in a more efficient manner and fresh electrolyte can replace the reaction products to insure continuous production of electrical power.

As shown in FIG. 5, in accordance with the invention, it is especially preferred that the apertures 38 be formed as a plurality of parallel elongated vertical slots in each anode. Apertures of this configuration and arrangement are especially effective in promoting egress of reaction product from, and sufficient electrolyte flow into and through, the anode-cathode gap to retard accumulation of reaction products therein. Especially with use of such vertically slotted anodes, the cell gap may be in a range between about 1/16 and about one inch (a preferred gap being between about 1/16 and about ⅜ inch and a most preferred gap range being between about ⅛ and about ¼ inch) without suffering undue shortening of useful operating time (between cleanings) because of accumulation of electrochemical reaction product in the cell gap.

Especially important features and advantages of the present invention reside in the provision of a common eletrolyte tank for a plurality of cells, with a single common electrolyte reservoir that can be easily filled in a single pouring operation and readily cleaned after use of the battery. The convenient structure of the unitized anode-cathode package 16 allows simple slidable insertion of the package into the electrolyte tank, and easy slidable removal thereof for cleaning after use. Such a construction with a unitized anode and cathode package 16 also allows selective replacement of the package when the anodes wear out; if desired, the entire anode and cathode package 16 may be replaced at once to provide fresh cathodes together with a new set of anodes.

Specifically, to enable use of a common electrolyte tank for a plurality of cells without significant current shunting through the electrolyte between anodes of different cells, the invention contemplates the provision of means for engaging the tank with the electrode-carrying frame (when the frame is inserted into the tank) so as to divide the electrolyte reservoir into a plurality of separate and substantially electrically isolated electrolyte-holding zones, one for each anode-cathode pair or cell. As best seen in FIGS. 3-5, in the illustrated embodiment of the invention this engaging means comprises a continuous rigid electrically conductive fin 40 formed integrally (e.g. molded) with and projecting outwardly from the side and bottom portions of the frame 26 around the entire side and bottom peripheries of the air chamber 30 (intermediate the two air cathodes), for continuously engaging the inner side and bottom walls of the tank along the entire length of the fin when the frame 26 is fully inserted in the tank.

The fin may simply abut the smooth tank wall 42, or, as shown, a continuous groove 44 may be formed in the tank side and bottom walls to receive the edge of the fin 40 along the entire length of the fin. Additionally, or alternatively, a gasket may be mounted on the frame or the tank inner wall to provide engagement between the tank and frame; one form of gasket, usable with the fin 40 and grooves 44, is shown at 46 in FIG. 5, mounted in a groove 44 defined by the tank interior surface for engaging the fin edge when the fin is inserted in that groove. This or other forms of gasket may be secured (to the tank or to the frame, as the case may be) in any suitable manner, e.g. with an adhesive. In still further alternative arrangements, a rigid fin similar to fin 40 may be formed on and project from the tank inner side and bottom walls to engage the surface of the frame or to be received within a groove formed in the frame surface. Another alternative embodiment is to provide a frame so shaped and dimensioned that the peripheral surface of its side and bottom portions engages directly with the inner wall 42 of the tank 14, or any other construction (e.g., a flexible blade or bead, carried by the frame) that segregates the common electrolyte tank into different zones to inhibit electrolytic shunting between anodes.

As indicated diagrammatically in FIG. 3, the illustrated battery also includes circuit means 48 (carried by the base 18) connecting the two anode-cathode pairs of cells in series with each other and with an external load represented by a light bulb B, with switch 24 also included in the circuit. That is to say, the anode of one anode-cathode pair or cell is connected to the cathode of the other pair or cell, and the bulb B and switch 24 are connected in series between the remaining cathode (of the first-mentioned cell) and anode (of the other cell).

The illustrated lamp 10 can be stored indefinitely with the base 18 seated on the tank 14, so long as the tank is empty (i.e., contains no electrolyte), without any deterioration of the electrodes or other elements. For use, the base is removed from the tank, together with the anode-cathode package 16 attached to the base; the single reservoir defined by the tank is filled with aqueous NaCl solution, as electrolyte, to a suitable level; and the package 16 is inserted in the electrolyte-containing reservoir until the base seats on the tank rim. The aluminum anodes 36 and the outwardly-facing surfaces of the air cathodes 28 are thus immersed in electrolyte, which fills the two anode-cathode gaps G and electrochemically couples the anode and cathode of each cell. At the same time, the surfaces of the cathodes 28 facing the air chamber 30 remain exposed to atmospheric oxygen, which enters the chamber 30 through the always-open vent 20. In accordance with known principles of metal/air battery operation, both cells of the battery now generate electric current, with a combined voltage sufficient to illuminate the bulb B upon closure of the switch 24.

In the assembled battery, the engagement of fin 40 with the wall 42 of tank 14 divides the single common electrolyte reservoir into two separate electrolyte-holding zones 49a and 49b (FIG. 4), each containing one of the anodes 36 and the air cathode surface facing that anode. These two zones 49a and 49b are substantially electrically isolated from each other, because even if there is some slight leakage around the fin edge, the engagement between the fin and wall (which engagement is essentially continuous around the entire boundary between the two zones, within the reservoir volume occupied by electrolyte) so greatly attenuates any electric current flow path through the electrolyte between the zones that little if any anode-to-anode shunting can occur through the electrolyte. Thus, impairment of cell efficiency by such shunting is prevented. The provision of fin-receiving grooves and/or gaskets contributes to the desired attenuation or elimination of zone-to-zone current flow paths at the boundary between zones.

As will be apparent from FIG. 4, in each zone 49a or 49b there is a relatively large electrolyte volume external to the anode-cathode gap therein, and the anode major surface facing away from the anode-cathode gap is exposed to this external volume. Consequently, the slots 38 formed in each anode provide passages for egress of reaction product from the anode-cathode gap to the external volume of electrolyte as the cell operation proceeds, the shape and orientation of the slots being especially conducive to such egress. The accumulation of reaction product within the anode-cathode gaps is thereby retarded, even though the gaps may be made relatively narrow for reasons of cell efficiency. Particularly in a narrow gap, the caustic formed adjacent the electrolyte-exposed cathode surface initially inhibits formation of gel-like aluminum hydroxide reaction product in the gap, and contributes to the retardation of reaction product accumulation between anode and cathode.

When it is desired to render the battery inoperative, or necessary to clean the cell, the base 18 with the attached package 16 are removed from the tank 14; and the tank reservoir is emptied of electrolyte and washed, as is the anode-cathode package. These operations are facilitated because only a single reservoir needs to be emptied and cleaned even though the battery has two cells.

Additional features of the invention are embodied in the switch device 24 incorporated in the circuit means of the illustrated lamp. This switch 24 allows sliding motion of the lamp member 22 up and down the contacts of the switch, electrical connection being established when the member 22 is raised to its uppermost position away from the base 18 and being interrupted when the member 22 is translated downwardly towards the base 18.

The switch 24 includes a cartridge portion of member 22, which carries the bulb B and bears a pair of electrically nonconductive slider projections or lugs 54 respectively formed on opposite side surfaces of the cartridge. A pair of electrical contacts 56 are electrically connected to the bulb B and respectively project through and slightly beyond the lugs 54. The structure also includes a pair of stiffly resilient channel-defining electrically nonconductive arms 50 formed integrally with and extending upwardly from the base 18 in spaced and, when unstressed, substantially parallel relation to each other with their channels opening toward each other and with the cartridge disposed between them, so that the lugs 54 respectively engage channel-leg-defining portions of the arms 50; the contacts 56 respectively project into the channels of the arms, and the cartridge forces the arms apart divergently from their unstressed positions. A stop 51 at the top of each arm limits upward travel of the lugs.

A pair of flat metal conductor strips 52 are connected in the circuit 48 and respectively extend within the channels of the arms 50; each channel has a lower portion sufficiently deep to hold the contact 56 projecting therein away from the conductor 52 extending therein, and an upper portion sufficiently shallow to permit engagement of the last-mentioned contact and conductor, such that upward movement of the cartridge relative to the arms permits the arms to converge resiliently, completing an electric circuit through the battery and the load when the lugs reach the upper portions of the arms (FIG. 6), and such that downward movement of the cartridge relative to the arms causes the arms to diverge, opening the circuit when the lugs reach the lower portions of the arms (FIG. 7).

That is to say, the arms 50 cooperatively grip and retain the cartridge of lamp member 22 between them at any vertical position to which the cartridge is moved, because they are resilient and outwardly deformed by the cartridge. The conductors 52 lie flat in the bases of the channels of these arms. The lugs 54 interferingly engage, and ride on, the edges of the legs or sides of the channels. In the lower portions of the arms 52, where the channels are relatively deep, the interfering engagement between legs and lugs holds the contacts 56 away from the conductors as shown in FIG. 7; but at the upper portions of the arms, where the channels are shallow, the contacts can engage the conductors, and when the cartridge is moved to these upper portions of the arms, the resilient bias of the arms urges the arms inwardly, bringing the conductors into such engagement with the contacts, as indicated in FIG. 6.

While the illustrated lamp and its incorporated battery exemplify one embodiment and use of the invention, many other embodiments and uses are possible. For instance, while the metal/air battery as shown in the described embodiment has only two cells, a battery in accordance with the invention may be provided with more than two cells by, for example, affixing more than two air cathodes 28 to the frame 26, with the cathodes sharing one or more common air chambers; providing a corresponding anode for each cathode; and configuring the frame 26 to segregate the tank 14 into a plurality of separate cells zones for each anode-cathode pair.

Moreover, the described apertured anode construction may be utilized in any type of metal/air cell and the feature of a single electrolyte tank segregated into separate cell zones by a frame engaged therewith may be utilized with anodes or air cathodes of various constructions including anodes without apertures. The switch 24 may also be used in other environments.

It is to be understood that the invention is not limited to the features and embodiments hereinabove specifically set forth but may be carried out in other ways without departure from its spirit.

What is claimed is:
1. A metal air battery comprising
  (a) a tank defining a single continuous reservoir for liquid electrolyte;

(b) a plurality of air cathodes each having first and second opposed surfaces;

(c) an electrically nonconductive frame carrying the cathodes in electrically isolated relation to each other and defining with the cathode first surfaces a liquid-tight air chamber open to ambient atmosphere, the frame being removably insertable in the reservoir to expose the cathode second surfaces to electrolyte therein;

(d) a plurality of metal anode, one for each cathode, disposed for immersion in electrolyte in the reservoir in spaced juxtaposed relation to the cathode second surfaces to constitute therewith a plurality of anode-cathode pairs each electrically coupled by electrolyte;

(e) circuit means for connecting said anode-cathode pairs in series to each other and to an external load; and (f) means for engaging the frame with the tank, when the frame is inserted in the reservoir, to divide the reservoir into a plurality of separate and substantially electrically isolated electrolyte-holding zones each containing one anode and the cathode second surface juxtaposed thereto, so as to inhibit anode-to-anode current flow through the electrolyte.

2. A battery as defined in claim 1, wherein said engaging means comprises portions of said frame electrically isolating the cathodes from each other and simultaneously engageable with the tank, when the frame is inserted in the reservoir, for dividing the reservoir into said plurality of separate and substantially electrically isolated electrolyte-holding zones.

3. A battery as defined in claim 1, wherein said anodes are carried by said frame externally of said air chamber for insertion therewith in said reservoir.

4. A battery as defined in claim 1, wherein said engaging means includes an electrically nonconductive fin projecting from one of said frame and said tank for engaging the other of said frame and said tank when the frame is inserted in the reservoir.

5. A battery as defined in claiam 4, wherein said other of said frame and said tank is formed with a groove for receiving said fin.

6. A battery as defined in claim 1, wherein said engaging means comprises a gasket carried by one of said frame and said tank and engageable with the other of said frame and said tank.

7. A battery as defined in claim 2, wherein there are two of said air cathodes, respectively having planar vertical first surfaces disposed in facing spaced parallel relation to each other on opposite sides of said air chamber; wherein there are two of said anodes, carried by said frame externally of said air chamber and respectively disposed in facing spaced relation to said cathode second surfaces, and wherein said frame portions include a pair of vertical portions, respectively located on opposite sides of the air chamber, each interconnecting and disposed between side edges of the two cathodes, and a bottom portion interconnecting and disposed between the vertical portions and the bottom edges of the two cathodes.

8. A battery as defined in claim 2, wherein said cathode surfaces extend generally vertically, wherein said frame portions include a portion closing the bottom of said air chamber, and further including electrically nonconductive, liquid-impermeable barrier means projecting upwardly from the bottom-closing frame portion within the air chamber for preventing cathode-to-cathode electrical current flow through any liquid that may enter and collect in the bottom of the air chamber.

9. A battery as defined in claim 1, wherein each said anode is a metal plate having opposed substantially vertical major surfaces both disposed for exposure to electrolyte in one of said zones, one of said anode major surfaces being positioned in spaced juxtaposed relation to a cathode second surface to define therewith an anode-cathode gap for receiving electrolyte, and said plate being formed with a plurality of vertically elongated metal slots extending downwardly from a locality adjacent but below the top of said anode-cathode gap through both major surfaces of the plate for egress of electrolytic reaction product, formed in the anode-cathode gap when the gap is filled with electrolyte, from the gap to a region of said one zone external to the gap.

10. A battery as defined in claim 9, wherein said metal plate is an aluminum alloy plate.

11. A battery as defined in claim 1, wherein said circuit means includes a load; a cartridge carrying said load and having opposed electrically nonconductive lugs; a pair of electrical contacts connected to said load and respectively projecting through and slightly beyond said lugs; a pair of stiffly resilient channel-defining nonconductive arms extending upwardly from said frame so as to be always outside said reservoir, said arms being disposed in spaced and, when unstressed, substantially parallel relation with their channels opening toward each other and with said cartridge disposed between them, such that the lugs respectively engage channelleg-defining portions of the arms, the contacts respectively project into the channels of the arms, and the cartridge forces the arms apart divergently from their unstressed positions; and a pair of metal conductors respectively extending within the channels of the arms and connected to the anode-cathode pairs; and wherein each channel has a lower portion sufficiently deep to hold the contact projecting therein away from the conductor extending therein, and an upper portion sufficiently shallow to permit engagement of the last-mentioned contact and conductor, such that upward movement of the cartridge relative to the arms permits the arms to converge resiliently, completing an electrical circuit through the anode-cathode pairs and the load when the lugs reach the upper portions of the arms, and such that downward movement of the cartridge relative to the arms causes the arms to diverge, opening said circuit when the lugs reach the lower portions of the arms.

12. A battery as defined in claim 1, wherein said tank and said frame cooperatively constitute a housing and wherein said circuit means includes a load comprising a light bulb mounted on said housing externally of said reservoir.

13. A metal/air cell comprising (a) a tank defining a reservoir for liquid electrolyte;

(b) an air cathode having opposed vertical surfaces;

(c) means for supporting said cathode for simultaneous exposure of one of said surfaces to air and of the other of said surfaces to electrolyte in said reservoir;

(d) a metal anode comprising a metal plate having opposed vertical major surfaces, disposed for immersion in electrolyte in said reservoir with one plate major surface positioned in spaced juxtaposed relation to said other cathode surface to define therewith an anode-cathode gap for receiving electrolyte, and with the other plate major surface exposed to electrolyte and facing a region of the reservoir external to the gap; and (e) circuit means for connecting said anode and cathode to an external load;

(f) said plate being formed with a plurality of vertically elongated slots extending downwardly from a location adjacent but below the top of the anode-cathode gap through both major surfaces of the plate for egress of electrolytic reaction product, formed in the anode-cathode gap when the gap is filled with electrolyte, from the gap to said external region of the reservoir.

14. A cell as defined in claim 13, wherein said metal plate is an aluminum alloy plate.

* * * * *